United States Patent
Yamane et al.

(10) Patent No.: US 8,953,033 B2
(45) Date of Patent: Feb. 10, 2015

(54) ELECTRODE INSPECTION APPARATUS FOR SPOT WELDING

(75) Inventors: Toshimasa Yamane, Hiroshima (JP); Yoshiaki Yamane, Hiroshima (JP)

(73) Assignee: Keylex Corporation, Hiroshima (JP)

( * ) Notice: Subject to any disclaimer, the term of this patent is extended or adjusted under 35 U.S.C. 154(b) by 354 days.

(21) Appl. No.: 13/500,401

(22) PCT Filed: Sep. 9, 2010

(86) PCT No.: PCT/JP2010/066003
§ 371 (c)(1),
(2), (4) Date: Apr. 5, 2012

(87) PCT Pub. No.: WO2011/052308
PCT Pub. Date: May 5, 2011

(65) Prior Publication Data
US 2012/0200695 A1  Aug. 9, 2012

(30) Foreign Application Priority Data
Oct. 27, 2009  (JP) .................................. 2009-246347

(51) Int. Cl.
*H04N 9/47* (2006.01)
*H04N 7/18* (2006.01)
(Continued)

(52) U.S. Cl.
CPC ............ *G01B 11/08* (2013.01); *B23K 11/3063* (2013.01)
USPC .......................................................... 348/90

(58) Field of Classification Search
CPC .................................................... B23K 9/0956
USPC .......................................................... 348/90
See application file for complete search history.

(56) References Cited

U.S. PATENT DOCUMENTS 5,314,544 A * 5/1994 Oweis ................................ 134/5
7,205,483 B2 * 4/2007 Yamashita et al. ............ 174/254
(Continued)

FOREIGN PATENT DOCUMENTS

| CN | 1864905 A | 11/2006 |
| CN | 101041203 A | 9/2007 |

(Continued)

OTHER PUBLICATIONS

Hitachi, Ltd; machine translation of JP Patent No. 2942364B previously submitted as JP 04-275835, Foreign Patent Documents; Oct. 1, 1992; pp. 1-17.
(Continued)

*Primary Examiner* — Chikaodili E Anyikire
(74) *Attorney, Agent, or Firm* — James R. Young; Cochran Freund & Young LLC

(57) ABSTRACT

An electrode inspection apparatus for spot welding is provided for precisely measuring diameters of a tip of an electrode without reducing availability ratio in a production line, and is particularly useful when inspecting a weld gun having electrodes with a narrow distance therebetween.
A CCD camera 91 for imaging the tip of the electrode held to the weld gun is disposed in an inspection apparatus body 6. The inspection apparatus body 6 includes a measuring reference unit 7 in which a fixing hole 72a for fixing the tip of the electrode is formed, and a mirror 8 obliquely arranged with respect to the electrode so as to be distant from the fixing hole 72a at a position opposite to the electrode with respect to the measuring reference unit 7. The CCD camera 91 is disposed in a side of the mirror 8 with a distance therebetween for imaging the tip of the electrode from a direct front thereof reflected on the mirror 8 by reflection.

12 Claims, 15 Drawing Sheets

(51) Int. Cl.
  *G01B 11/08* (2006.01)
  *B23K 11/30* (2006.01)

(56) References Cited

U.S. PATENT DOCUMENTS

| | | | |
|---|---|---|---|
| 8,648,903 B2 * | 2/2014 | Loipetsberger | 348/90 |
| 2005/0205291 A1 * | 9/2005 | Yamashita et al. | 174/254 |
| 2005/0230362 A1 * | 10/2005 | Stieglbauer et al. | 219/119 |
| 2007/0138145 A1 * | 6/2007 | Stieglbauer et al. | 219/86.51 |
| 2007/0158337 A1 | 7/2007 | Stieglbauer et al. | |
| 2009/0128625 A1 | 5/2009 | Loipetsberger | |
| 2009/0173725 A1 * | 7/2009 | Holcomb et al. | 219/130.01 |

FOREIGN PATENT DOCUMENTS

| | | |
|---|---|---|
| JP | 01-192486 | 8/1989 |
| JP | 04-275835 | 10/1992 |
| JP | 2000-249820 | 9/2000 |
| JP | 2004-022949 | 1/2004 |
| JP | 2004-223574 A | 8/2004 |
| JP | 2008-275487 | 11/2008 |
| JP | 2009-160656 | 7/2009 |
| JP | 2009-162492 | 7/2009 |
| WO | 2007140492 A1 | 12/2007 |

OTHER PUBLICATIONS

Toray Eng Co Ltd; machine translation of JP publication No. 2004-022949 previously submitted as Foreign Patent Documents; Jan. 22, 2004; pp. 1-25.

Nagoya Electric Works Co Ltd; machine translation of JP publication No. 2008-275487 previously submitted as Foreign Patent Documents; Nov. 13, 2008; pp. 1-21.

Daishinku Corp; machine translation of JP publication No. 2009-162492 previously submitted as Foreign Patent Documents; Jul. 23, 2009; pp. 1-18.

Canon, Inc.; machine translation of JP publication No. 2000-249820 previously submitted as Foreign Patent Documents; Sep. 14, 2009; pp. 1-12.

International Search Report for PCT/JP2010/066003, Oct. 7, 2012, 2 pages.

* cited by examiner

US 8,953,033 B2

ELECTRODE INSPECTION APPARATUS FOR SPOT WELDING

TECHNICAL FIELD

The present disclosure relates to electrode inspection apparatuses for spot welding used in, for example, automobile production lines.

BACKGROUND ART

Conventionally, spot welding techniques of pressing electrodes mounted on and held to tips of a weld gun to steel plates, applying a pressure thereto, and causing energization to provide resistance heating to the steel plates to weld them together have been used in automobile production lines. The spot welding techniques ensure reliability of products with proper management of current values during welding, weld times, applied pressure force, and conditions of tips of the electrodes. Among these elements, the tips of the electrodes ensure welding quality most stably if they have a true circular shape and do not include waste materials attached thereto. However, after the welding is done a predetermined times, the tips of the electrodes do not have the true circular shape due to wear, or oxide coatings and the like are attached to the tips, resulting in deterioration of the tip condition, and if the welding is continuously performed with the tips deteriorated, the quality of the welded parts is not ensured. Therefore, it is necessary to dress the deteriorated tips of the electrodes so that the tips are a proper condition, and a proper management of the dressed condition is needed. For example, Patent Document 1 shows periodically capturing images of electrodes by a camera from a side of a weld gun with the electrodes mounted on and held to tips of the weld gun, calculating the diameters of tips of the electrodes by using the captured images, and checking conditions of the tips of the electrodes to compare and determine whether the electrodes are in a normal condition to manage the condition of dressing in the electrodes.

CITATION LIST

Patent Document

PATENT DOCUMENT 1: Japanese Patent Publication No. 2009-160656 (Paragraph and FIG. 1)

SUMMARY OF THE INVENTION

Technical Problem

If the tip of the electrode becomes elliptical in shape due to wear, the welding quality is not ensured, and therefore, it is necessary to measure diameters of the tip in at least two directions to compare and determine whether the tip is in a normal condition (true circle).

However, in Patent Document 1, since the electrodes are imaged by the camera from the side of the weld gun, in order to precisely measure the tip of the electrode, the image must be captured while the position of the weld gun or the position of the camera is changed, resulting in capturing much time for inspection, and reducing availability ratio in the production line. In order to avoid these problems, images may be captured by a camera from a side of the electrode tip. However, in most cases of the spot welding, a technique welding steel plates by sandwiching the steel plates with a pair of electrodes has been adopted, and the distance between the electrodes is short, and therefore, when the camera is disposed in the side closer to the electrode tip for capturing images, the electrode inspection apparatus has a large size, and therefore, the apparatus can be used only for weld guns having electrodes with a relatively wide distance therebetween, resulting in decreasing its versatility.

The entire length of the electrode becomes longer after dressing, and therefore, in the measurement method in such as Patent Document 1, whenever the electrode is dressed, a distance from the camera to the tip of the electrode varies, and therefore, variations of measured values may occur.

In view of the foregoing, the present invention has been developed. It is an object of the present invention to provide an electrode inspection apparatus for spot welding which can precisely measure diameters of tips of electrodes without reducing availability ratio in the production line, and which is particularly useful when using a weld gun having electrodes with a narrow distance therebetween.

Solution to the Problem

In order to attain the above object, the present invention is characterized by imaging a tip of an electrode from a direct front thereof reflected by reflection on a mirror disposed in a side closer to the tip of the electrode with the electrode fixed in a fixing hole of a measuring reference unit.

Specifically, the present invention is directed to an electrode inspection apparatus for spot welding, the apparatus including an inspection apparatus body in one or more cameras for imaging tips of one or more electrodes for spot welding held to a weld gun are disposed and a control unit having a calculation section processing images of the tips of the electrodes captured by the cameras, and a determining section comparing a calculation result in the calculation section with a preset value to determine conditions of the tips of the electrodes, and the following solving means are captured.

According to a first aspect of the present invention, the inspection apparatus body includes a measuring reference unit in which a fixing hole for fixing each of the tips of the electrodes is formed, and a mirror obliquely arranged with respect to one of the electrodes so as to be distant from the fixing hole at a position opposite to the one of the electrodes with respect to the measuring reference unit, where each of the cameras is disposed in a side of the mirror with a distance therebetween so as to image each of the tips of the electrodes from the direct front thereof.

According to a second aspect of the present invention related to the first aspect of the invention, a pair of the electrodes are provided so as to face each other in both sides of the minor, the mirror is formed into a plate shape, and has mirror planes for reflecting the tips of the electrodes at both sides thereof, and a pair of the cameras are provided in the both sides of the mirror.

According to a third aspect of the present invention related to the first aspect of the invention, a pair of the electrodes are provided so as to face each other in both sides of the mirror, the mirror is formed into a plate shape, has a mirror plane for reflecting the tips of the electrodes at one side thereof, and is rotatably attached to the inspection apparatus body, and one of the cameras is only provided for rotating the mirror to switch the electrodes reflected on the mirror to image the respective tips of the electrodes from the direct front thereof.

According to a fourth aspect of the present invention related to the first aspect of the invention, a pair of the electrodes are provided so as to face each other in both sides of the mirror, and the mirror is provided so as to include a pair of mirror sections for reflecting the respective tips of the electrodes, and one of the cameras is only provided for simultaneously imaging the respective tips of the electrodes reflected on the respective mirrors from the direct front thereof.

According to a fifth aspect of the present invention related to any one of the first through the fourth aspects of the invention, illumination light sources are disposed around a periphery of the lens of the cameras, and are made of an LED.

According to a sixth aspect of the present invention related to the fifth aspect of the invention, the inspection apparatus body is provided with a light quantity adjustment wall including a light through hole therein and disposed so as to be in a vicinity of a front of each of the cameras, and a space through which light emitted from the illumination light sources passes is formed between an inner periphery of the light through hole and the outer periphery of each of the cameras.

According to a seventh aspect of the present invention related to the fifth aspect or the sixth aspect of the invention, the inspection apparatus body is provided with a protective cover for filling the fixing hole, and the protective cover is provided with a curved portion for reflecting the light which has been reflected on the mirror from the illumination light sources beyond a scope where the cameras can capture images.

According to an eighth aspect of the present invention related to any one of the fifth through the seventh aspects of the invention, the inspection apparatus body is provided with a shield plate shielding the light emitted from the illumination light sources and directly directing toward the electrode, and located between the illumination light sources and each of the electrodes.

According to a ninth aspect of the present invention related to any one of the first through the eighth aspects of the invention, the inspection apparatus body is provided with a plurality of edge detection light sources illuminating the periphery of the tips of the electrodes with each of the electrodes fixed to the fixing hole.

According to a tenth aspect of the present invention related to the ninth aspect of the invention, the edge detection light sources are made of a blue LED.

According to an eleventh aspect of the present invention related to any one of the first through the tenth aspects of the invention, the control unit includes a data storage section storing the images captured by the cameras, the calculation result processed by the calculation section, and the result of comparison and determination by the determining section.

According to a twelfth aspect of the present invention related to any one of the first through the eleventh aspects of the invention, a display section includes for displaying the images captured by the cameras, the calculation result processed by the calculation section, and a result compared and determined by the determining section.

Advantages of the Invention

According to the first aspect of the present invention, a distance from the electrode to the camera through the mirror is constant, and therefore, variations of the measured values are less likely to occur. Besides, the image of the tip of the electrode can be captured by the camera from the direct front thereof, and therefore, the captured image is processed by the calculation section, thereby measuring at least two or more tip diameters at one time. With this process, the measurement of the diameters of the electrode tip, i.e., determination of whether the tip has a true circular shape or not, is accurately performed without reducing availability ratio in a production line.

According to the second aspect of the present invention, both surfaces of the mirror reflect the respective tips of the electrodes at the same time, whereby images of the tips of the pair of the electrodes are captured simultaneously, and the diameters of the electrode tip is accurately measured without reducing availability ratio in the production line. Since the camera is not disposed between the pair of the tips of the electrodes, and only the mirror is disposed between the electrodes, a width of a portion of the inspection apparatus body located between the electrodes is short, thereby providing a compact structure as a whole.

According to the third aspect of the present invention, if the mirror rotates rotate 90 degrees, whereby each of tips of the electrodes is imaged by the camera. Therefore, the inspection apparatus is provided with low cost and a compact structure.

According to the fourth aspect of the present invention, the respective tips of the pair of the electrodes are simultaneously imaged by the camera even if the mirror does not rotate. Therefore, the inspection apparatus is provided with low cost and a compact structure without reducing availability ratio in the production line.

According to the fifth aspect of the present invention, the inspection apparatus has a compact structure while light that is necessary to capture images by the camera is sufficiently generated.

According to the sixth aspect of the present invention, part of the light emitted from the illumination light sources are shielded by the light quantity adjustment wall, thereby making it possible to set light quantity which is sufficiently for imaging the electrodes and to image the electrodes clearly.

According to the seventh aspect of the present invention, the protective cover prevents dust and the like attached to the tips of the electrodes from entering the inside of the inspection apparatus body from the fixing hole. The light emitted from the illumination light sources and reflecting on the protective cover is diffused in the curved portion of the protective cover, and does not reflect on the lens of the camera, thereby making it possible to image the electrodes clearly.

According to the eighth aspect of the present invention, even when the distance between the illumination light sources and the electrodes is shortened, the light emitted from the illumination light sources does not directly illuminate the tip of the electrode, and the structure avoids a state where the light directly illuminating the tip of the electrode from the illumination light sources reflects on the camera, and the like. Therefore, the inspection apparatus body has a compact structure while the electrodes are clearly viewed.

According to the ninth aspect of the present invention, the tip periphery of the electrode is clearly imaged on the image captured by the camera. Therefore, the calculation of the captured images by the calculation section is precisely processed, thereby making it possible to measure the diameters of the tips of the electrodes.

According to the tenth aspect of the present invention, unlike an LED of white light, when the blue LED is used, the blur in the tip periphery of the electrode due to glaze of the electrode does not occur, and the tip periphery of the electrode is clearly imaged on the image captured by the camera, thereby the calculation processing by the calculation section is further accurate.

According to the eleventh aspect of the present invention, the captured images or the processed data can be confirmed after the inspection. Therefore, a dressing cycle of the electrode and the like can be considered later based on the obtained data.

According to the twelfth aspect of the present invention, the workers can know the condition of the electrodes even if the workers do not enter the production line, and the workers safely manages the production line.

BRIEF DESCRIPTION OF THE DRAWINGS

FIG. 6(a) is an image before a calculation processing is performed in a calculation section, and FIG. 6(b) is an image after the calculation processing is performed in the calculation section.

FIG. 7(a) is an image before the calculation processing is performed in the calculation section, and FIG. 7(b) is an image after the calculation processing is performed in the calculation section.

FIG. 8(a) is an image before the calculation processing is performed in the calculation section, and FIG. 8(b) is an image after the calculation processing is performed in the calculation section.

FIG. 9(a) is an image before the calculation processing is performed in the calculation section, and FIG. 9(b) is an image after the calculation processing is performed in the calculation section.

FIG. 10(a) is an image before the calculation processing is performed in the calculation section, and FIG. 10(b) is an image after the calculation processing is performed in the calculation section.

DESCRIPTION OF EMBODIMENTS

Figure 1:
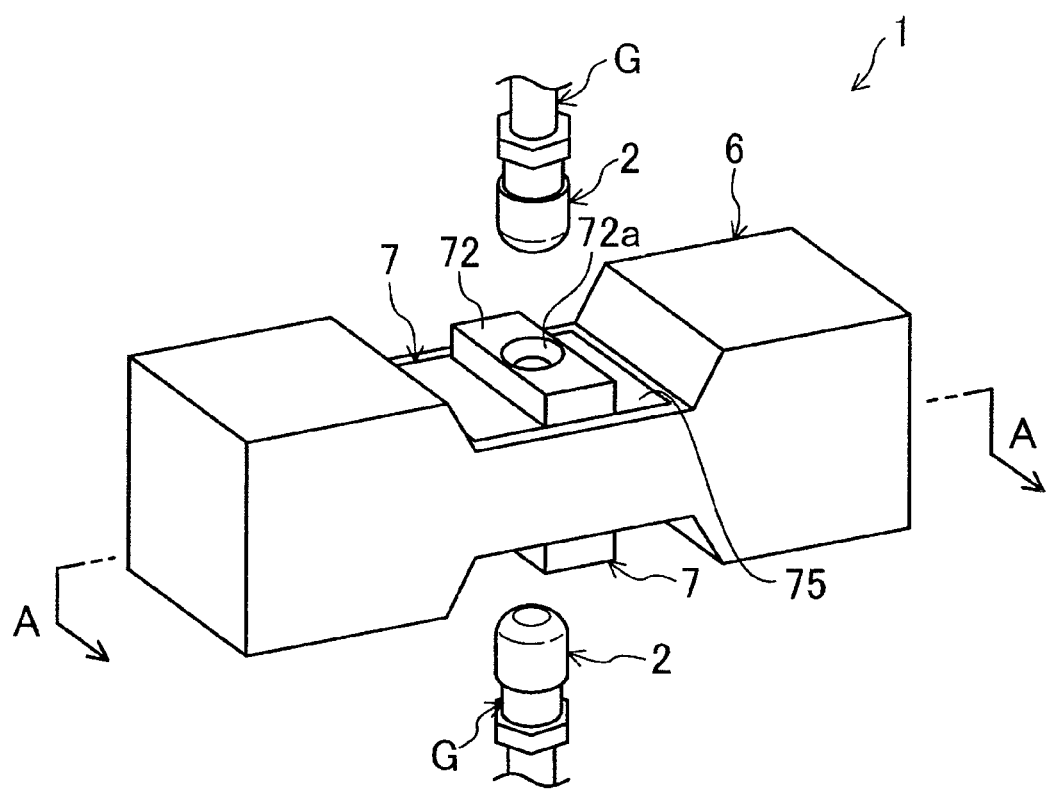
FIG. 1 is a perspective view of an electrode inspection apparatus according to a first embodiment of the present invention.

Embodiments of the present invention will be described in detail hereinafter with reference to the accompanying drawings. The following explanations of preferred embodiments are substantially mere examples.

<<First Embodiment>>

FIGS. 1-5 show an electrode inspection apparatus 1 for spot welding according to a first embodiment. This electrode inspection apparatus 1 is used for inspecting conditions of a pair of electrodes 2 made of chromium-copper or the like and mounted on and held to tips of a weld gun G used when steel plates are welded together by spot welding in automobile production lines. The electrode inspection apparatus 1 includes an inspection apparatus body 6 formed by processing steel plates.

The inspection apparatus body 6 is formed into a box shape of a substantially rectangular parallelepiped extending in a horizontal direction. Central portions of both upper and lower walls in the longitudinal direction are recessed, the distance between the central portions in the longitudinal direction are narrower than the distance between portions at both sides in the longitudinal direction. The outer shape of the inspection apparatus body 6 is vertically symmetrical. Each of the recessed central portions of the upper and lower walls of the inspection apparatus body 6 includes a through hole 61 which vertically passing through the central portion, and a measuring reference unit 7.

The measuring reference unit 7 in the upper wall side includes a board 74 located outside the inspection apparatus body 6, a protective cover 75 located outside the board 74 and protecting a surface of the board 74, and an electrode fixing plate 72 located outside the protective cover 75 and fixing the electrode 2 to be inspected.

Figure 3:
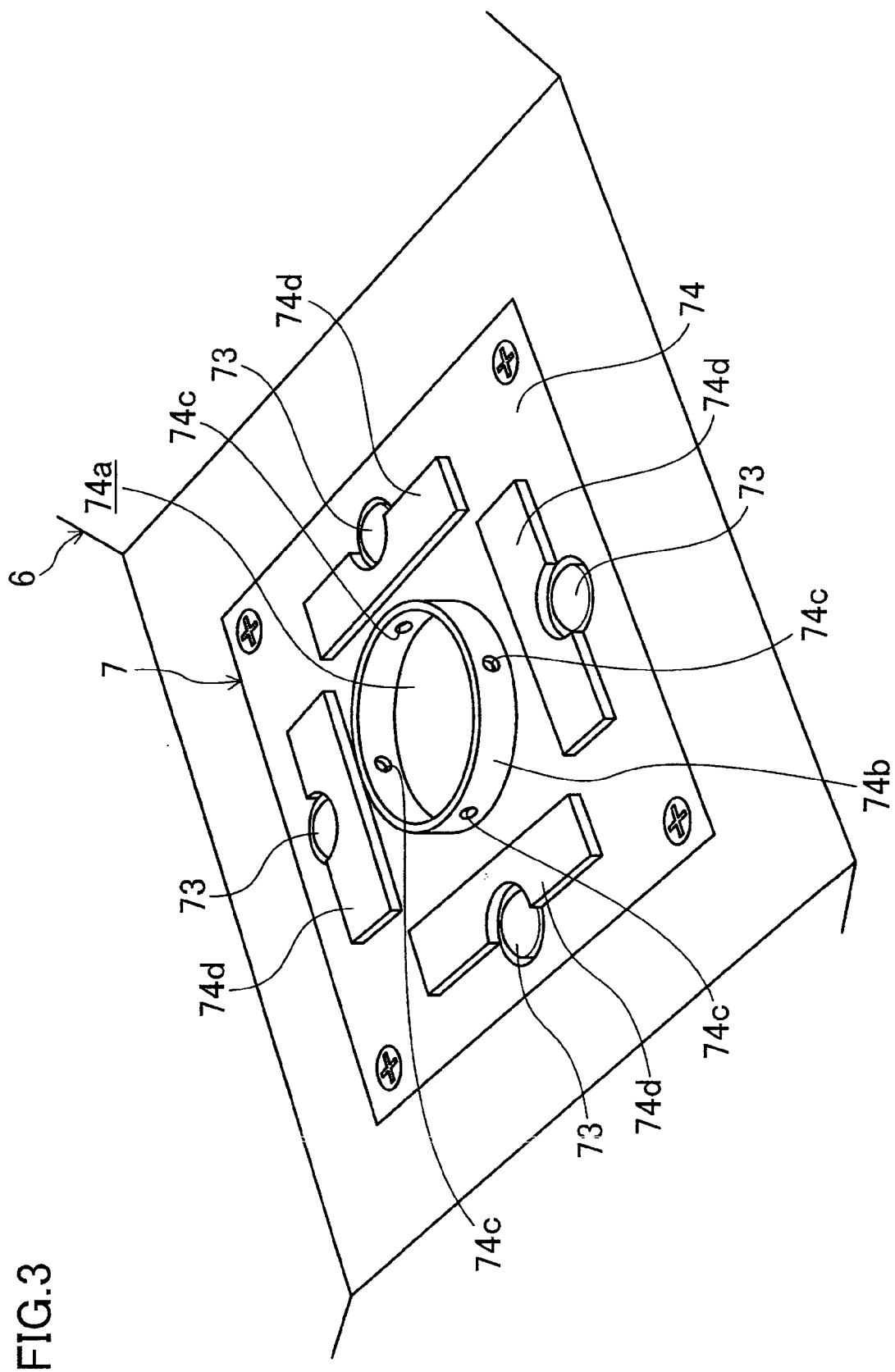
FIG. 3 is a perspective view showing a part of a measurement reference unit according to the first embodiment of the present invention.

The board 74 is formed into a generally square plate, as shown in FIG. 3, and includes in a central portion thereof a through hole 74a located in a position corresponding to the through hole 61 of the inspection apparatus body 6. A circular protrusion 74b protruding upwardly is formed in the periphery of the through hole 74a of the board 74. On a wall of the circular protrusion 74b, four light source holes 74c are formed so as to be located at positions in the longitudinal direction and the width direction of the inspection apparatus body 6.

In the outside of the circular protrusion 74b on the board 74, in positions corresponding to the light source holes 74c, four edge detection light sources 73 made of an LED emitting blue light are provided to the vicinity of the circular protrusion 74b with the same interval therebetween. An acrylic plate 74d having a substantially rectangular shape are attached between the edge detection light source 73 and the light source hole 74c. Light emitted from the edge detection light source 73 is collected in the acrylic plate 74d, passes through the light source hole 74c, and illuminates from a radial direction a tip periphery of the electrode 2 fixed to a fixing hole 72a to be hereinafter described, whereby the tip periphery of the electrode 2 becomes clear by blue right Be from the detection light sources 73 (see FIGS. 6-10).

Figure 4:
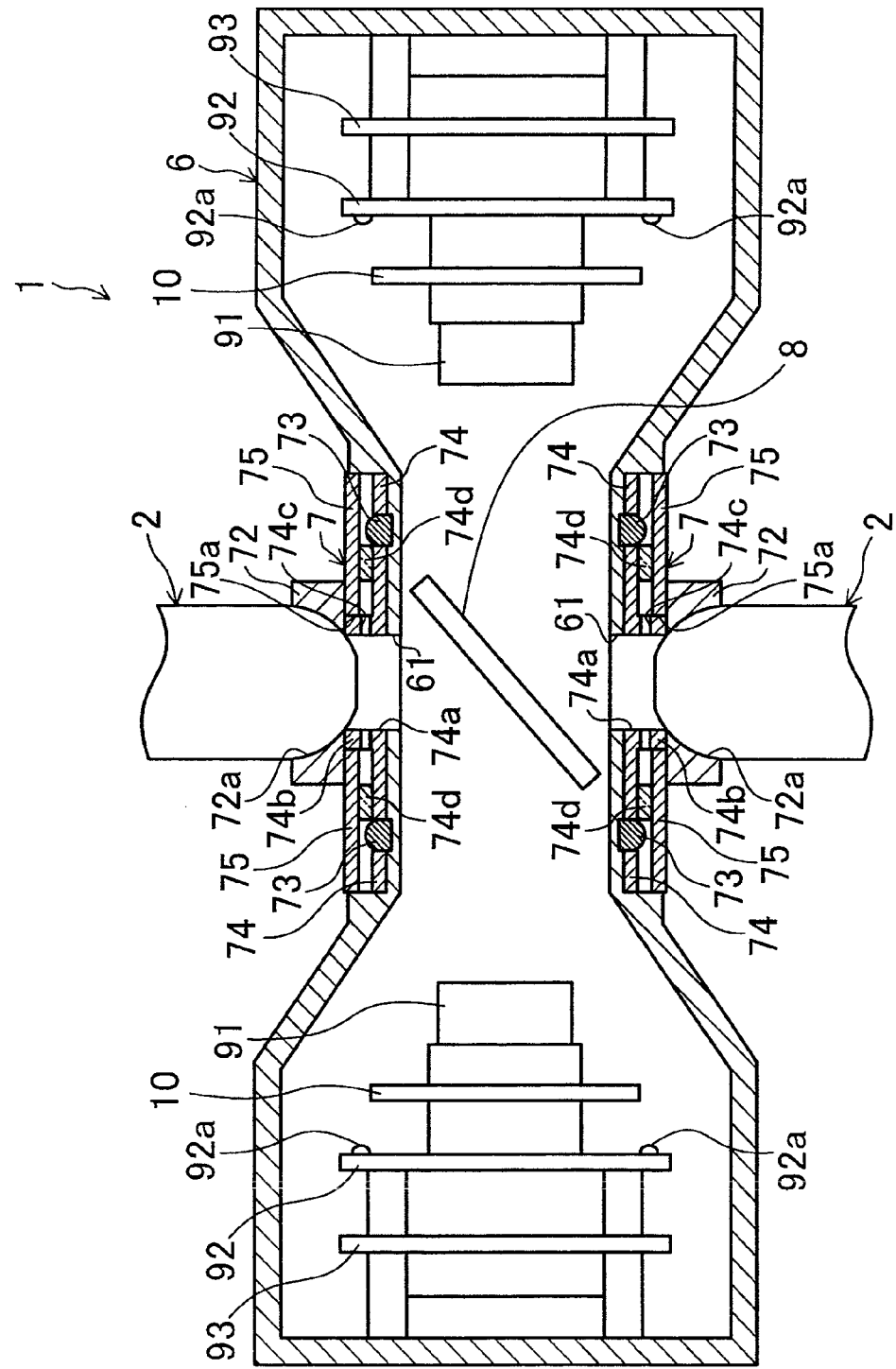
FIG. 4 is a cross-sectional view taken along line A-A in FIG. 1.

The protective cover 75 is formed into a generally square plate, and includes a through hole 75a fitting into an upper edge of the circular protrusion 74b of the board 74 is formed in a central portion of the protective cover 75, as shown in FIG. 4.

The electrode fixing plate 72 is formed into a generally rectangular plate extending in the width direction of the inspection apparatus body 6, and is attached to the upper surface of the protective cover 75. The fixing hole 72a formed in the middle of the electrode fixing plate 72 and pierced along the vertical direction has a diameter which becomes gradually smaller toward the lower side, and the lower edge portion of the electrode fixing plate 72 corresponds to the position of the through hole 74a in the board the board 74. The shape of the fixing hole 72a corresponds to that of the electrode 2, and when the electrode 2 is inserted into the fixing hole fixing hole 72a, the electrode 2 is stably fixed so as not to move, and the position of the electrode 2 is not shifted. The fixing hole 72a has several different types in shape, and when another type of the electrode 2 different in shape and diameter of tip is inspected, the electrode fixing plate 72 is configured to perform the inspection by changing the electrode fixing plate 72 to another type of the electrode fixing plate 72.

Figure 2:
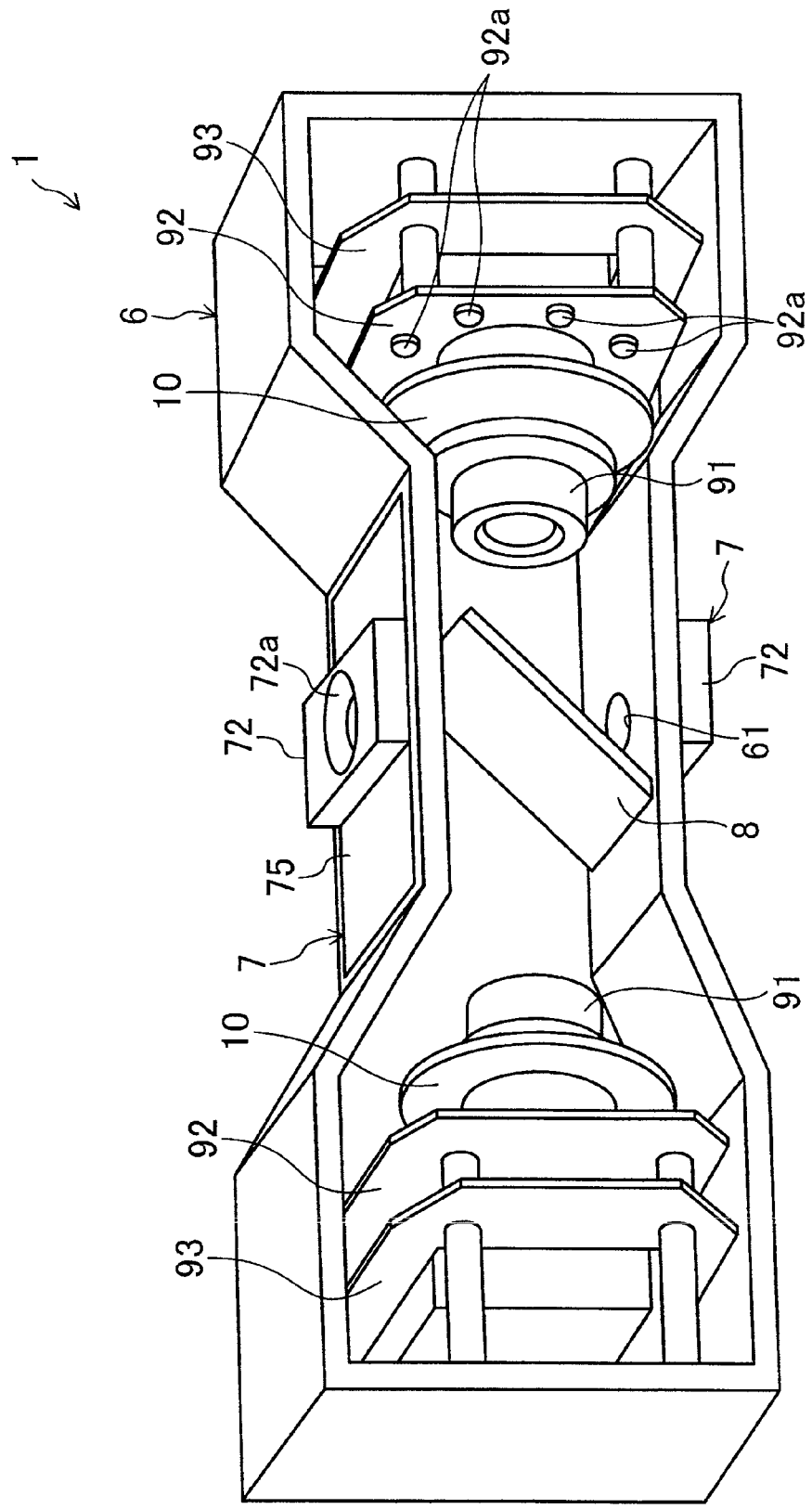
FIG. 2 is a perspective view showing the inside of the electrode inspection apparatus according to the first embodiment of the present invention.

As shown in FIGS. 2 and 4, a mirror 8 with a plate shape is fixed in the substantially central portion of the inspection apparatus body 6. The mirror 8 has mirror planes at both side thereof, and is obliquely arranged with respect to the electrode 2 so as to be distant from the fixing hole 72a at a position opposite to the electrode 2 with respect to the measuring reference unit 7.

In both ends of the inspection apparatus body 6 in the longitudinal direction, a pair of CCD cameras 91 for imaging the tips of the electrodes 2 from a direct front thereof reflected on the mirror 8 by reflection are disposed in both sides of the mirror 8 so as to be distant from the mirror 8, with supported by camera boards 92 and 93 having a plate shape. A plurality of illumination light sources 92a made of an LED emitting white light to the periphery of the lens of the CCD cameras 91 are attached to the camera board 92 with the same interval therebetween so that images captured by the CCD cameras 91 are clear.

A diffusion plate 10 extending outwardly from the outer periphery of the CCD camera 91 is provided between the camera board 92 and the mirror 8. The diffusion plate 10 is made of a resin having a milky white color, and is configured to diffuse light emitted from the plurality of the illumination light sources 92a and directing toward the mirror 8, thereby alleviating the problem of a non-uniform brightness distribution in light.

The measuring reference unit 7 is also provided in a side of the lower wall of the inspection apparatus body 6. The configuration of the measuring reference unit 7 in the side of the lower wall and the configuration of the measuring reference unit 7 in the side of the upper wall are symmetrical with respect to the central portion of the inspection apparatus body 6 in the vertical direction.

Figure 5:
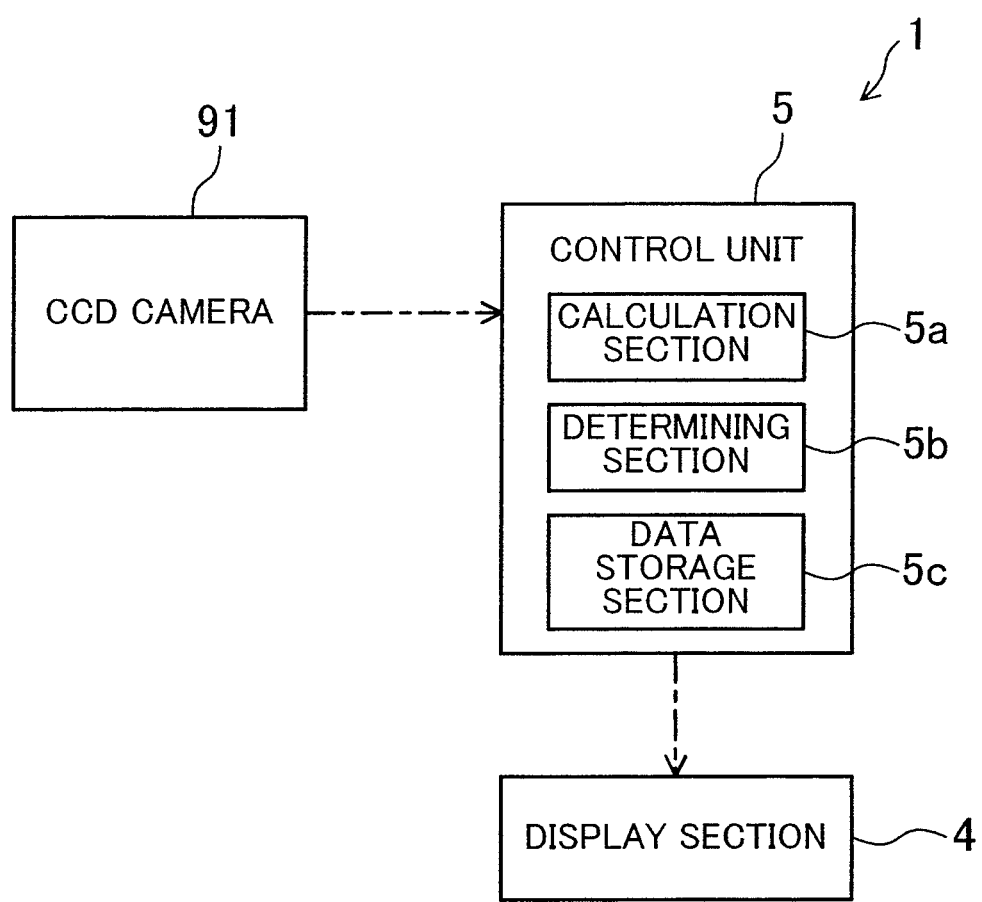
FIG. 5 is a control block diagram of the electrode inspection apparatus according to the first embodiment of the present invention.

As shown in FIG. 5, a control unit 5 is connected to the CCD camera 91, a display section 4 to be hereinafter described, and a general-purpose robot (not shown) holding the weld gun G or a control unit (not shown) in a production line. The control unit 5 includes an calculation section 5a, a determining section 5b, and a data storage section 5c, and is configured to initiate the inspection of the tip of the electrode 2 by a signal for initiating the inspection transmitted from the general-purpose robot (not shown) or the control unit (not shown) in the production line. The control unit the control unit 5 is configured to, based on the result of the inspection, command the general-purpose robot (not shown) or the control unit (not shown) in the production line to perform a subsequent operation.

As shown in FIGS. 6-10, the calculation section 5a is configured to calculate diameters r1 and r2 of the electrode tip in two directions based on a position of the tip periphery of the electrode 2 in which the gray level difference is clear by the light emitted from the edge detection light sources 73. The calculation section 5a is configured to, based on the above result, generate a virtual circle C by a calculation processing. Based on the gray level difference between the color of the chromium-copper of the electrode 2 and a different portion, the calculation section 5a is configured to perform a calculation processing with respect to ratios s1 and s2 of waste materials (oxide coatings and plating) attached to the tip. Specifically, the calculation section 5a is configured to calculate a ratio s1 of an area of a range S1 where the oxide coatings are attached to the tip (white part of the electrode tips in FIGS. 6-10) to the area of the generated virtual circle C, and a ratio s2 of an area of a range S2 where the plating is attached to the tip (black part of the electrode tips in FIGS. 6-10) to the area of the generated virtual circle C.

The determining section 5b is configured to compare the calculation result processed by the calculation section 5a, and a preset value in the data storage section 5c and make a determination.

The data storage section 5c is configured to store set values which are to be references of the diameters r1 and r2 of the electrode tip, the ratios s1 and s2 of the waste materials attached to the tip, and the like. The data storage section 5c is also configured to store images captured by the CCD camera 91, data of the diameters r1 and r2 of the electrode tip, the ratios s1 and s2 of the waste materials attached to the tip calculated by the calculation section 5a, and data of the result of the determination by the determining section 5b.

As shown in FIG. 5, the electrode inspection apparatus 1 is provided with a display section 4 which can display, by the command from the control unit 5, the images of the tip of the electrode 2 captured by the CCD camera 91, the calculation result in the calculation section 5a, and the result of the determination by the determining section 5b.

Next, a control of the control unit 5 will be described in detail hereinafter. Each of the pair of the electrodes 2 which has spot-welded steel plates at a predetermined time with the weld gun G is dressed by a dresser (not shown). Then, each of the pair of the electrodes 2 is inserted into the fixing hole 72a of the measuring reference unit 7 from the upper direction or lower direction of the inspection apparatus body 6. After the electrode 2 is fixed to the fixing hole 72a, the control unit 5 receives a signal for initiating an inspection from the general-purpose robot (not shown) holding the weld gun G or the control unit (not shown) in the production line.

Upon receiving the signal for initiating an inspection, the control unit 5 commands the CCD camera 91 to capture an image of the tip of the electrode 2. Based on the command, the CCD camera 91 captures the image of the tip of the electrode 2. At this time, the CCD camera 91 can capture the image of the tip of the electrode 2 from the direct front thereof by using the inclined mirror 8.

Figure 6:
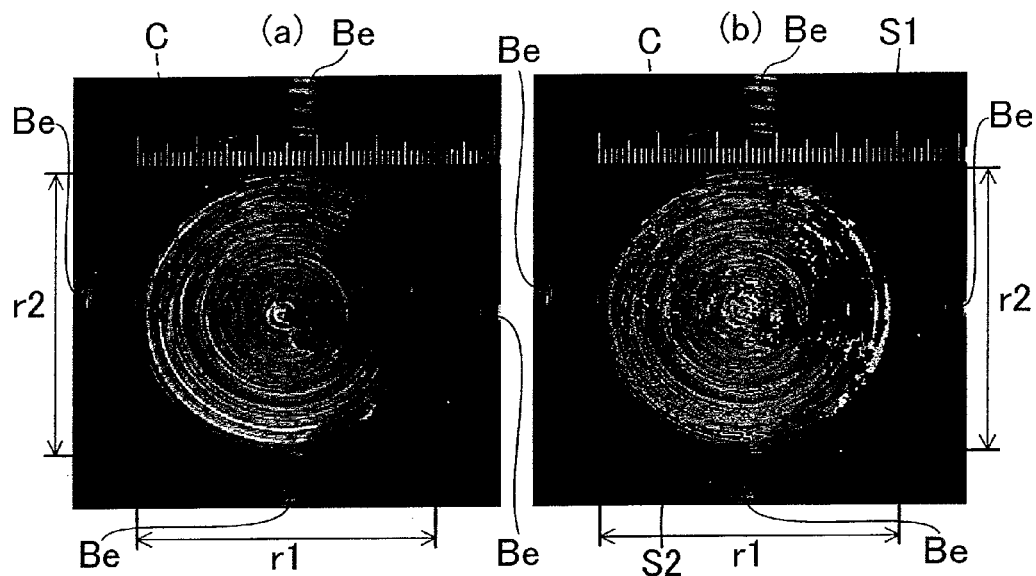
FIGS. 6 are images of an electrode captured by a camera in a normal state.
Figure 7:
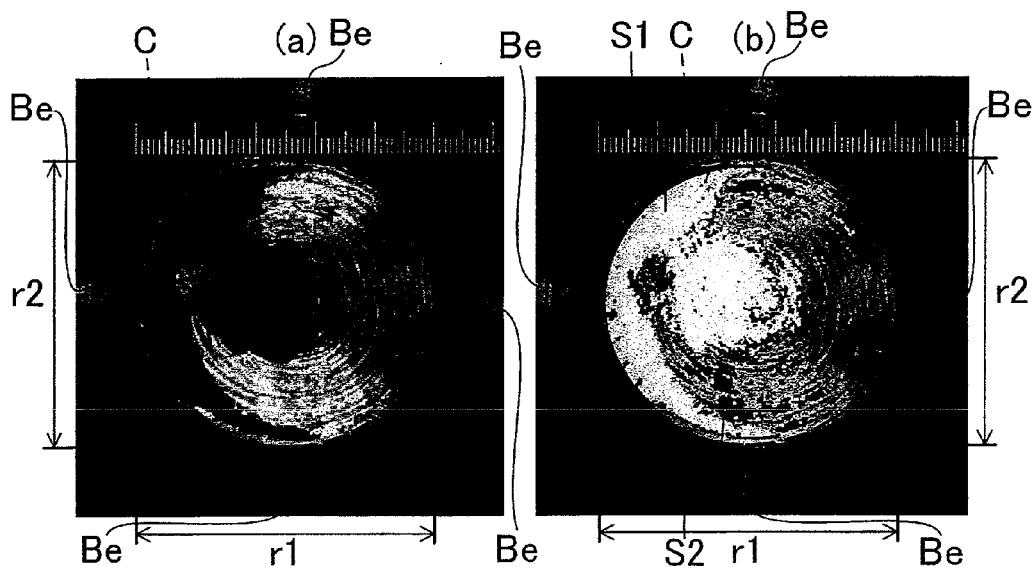
FIGS. 7 are images of an electrode captured by a camera where diameter of the tip of the electrode is within a normal range, and oxide coatings are attached to the electrode in large quantities.
Figure 8:
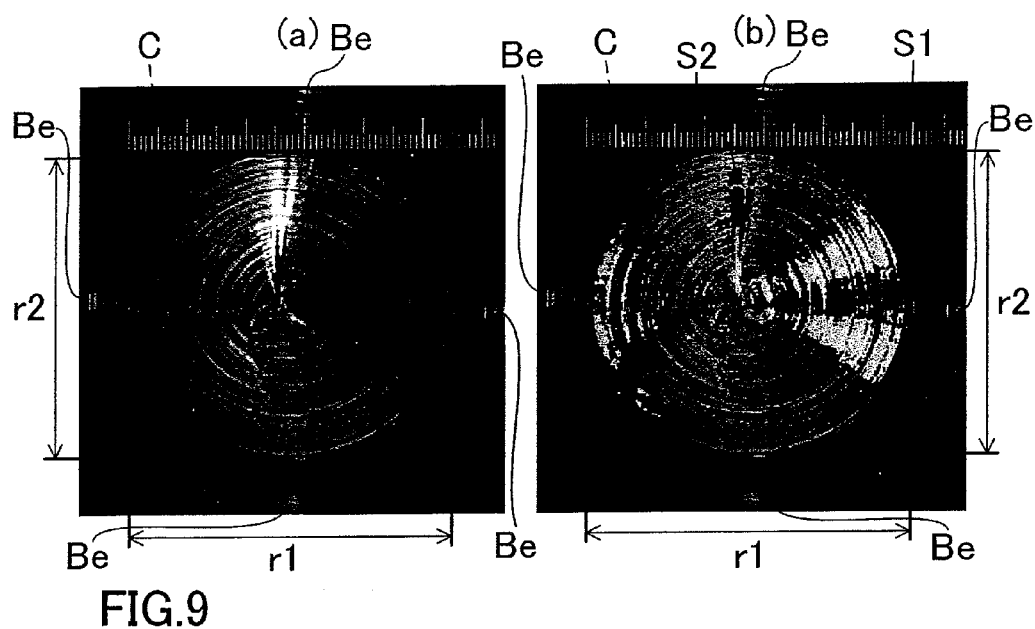
FIGS. 8 are images of an electrode captured by a camera where diameter of the tip of the electrode exceeds the normal range, and oxide coatings are attached to the electrode in small quantities.
Figure 9:
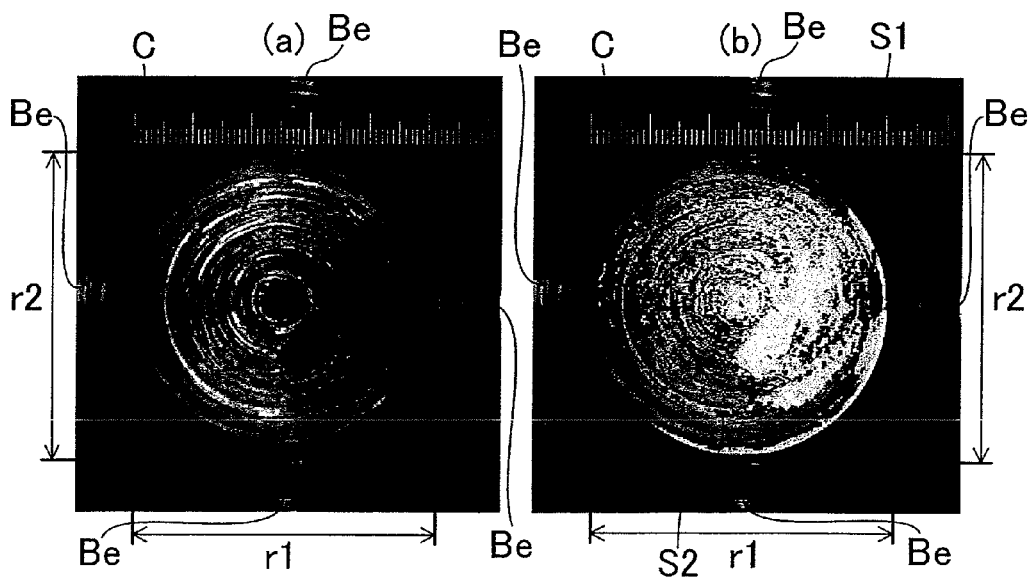
FIGS. 9 are images of an electrode captured by a camera where diameter of the tip of the electrode exceeds the normal range, and oxide coatings are attached to the electrode in large quantities.
Figure 10:
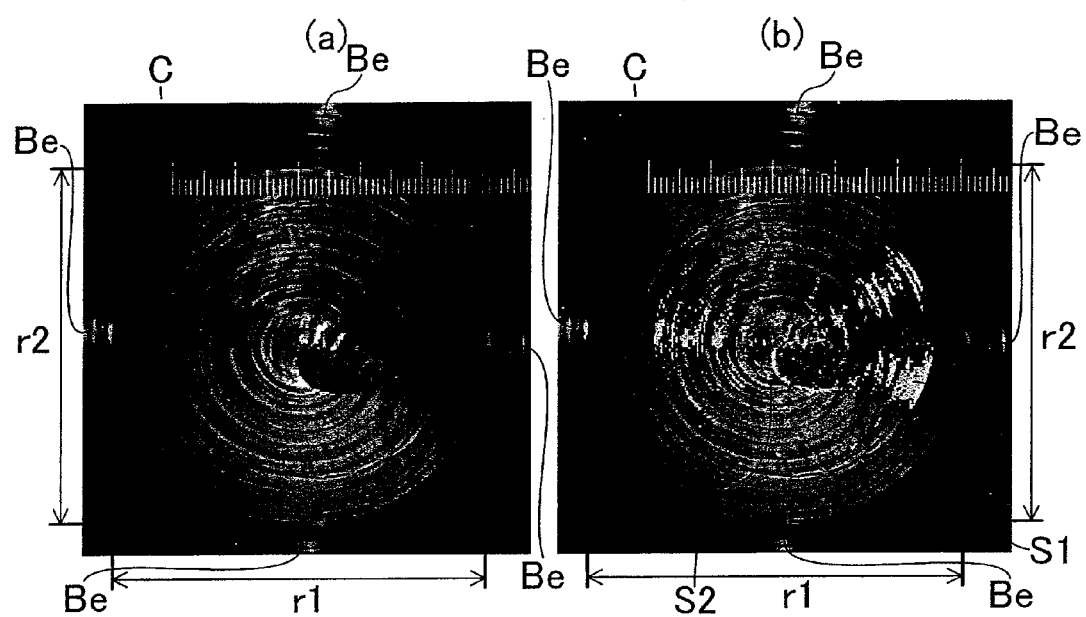
FIGS. 10 are images of an electrode captured by a camera where diameter of the tip of the electrode exceeds the normal range, and exceeds a set value regarded as being outside of an allowable range.

The calculation section 5a performs a calculation processing with respect to the diameters r1 and r2 of the electrode tip, and the ratios s1 and s2 of the waste materials attached to the tip of the electrode 2 by using the captured images stored in the data storage section 5c. The diameters r1 and r2 of the tip of the electrode 2 in two directions are calculated from the position of the tip periphery of the electrode 2 which is clearly viewed by the light emitted from the edge detection light sources 73. Based on the above result, a virtual circle C of the tip periphery of the electrode 2 is generated by the calculation processing, and the ratio s1 of the area of the range S1 where the oxide coatings are attached to the tip (white part of the electrode tip in FIGS. 6-10) to the area of the generated virtual circle C, and the ratio s2 of the area of the range S2 where the plating is attached to the tip (black part of the electrode tip in FIGS. 6-10) to the area of the generated virtual circle C are calculated. For example, regarding the electrode 2 shown in FIG. 6(a), as shown in FIG. 6(b), the diameters of the electrode tip are calculated as follows: r1=5.02 mm; and r2=4.99 mm, and the ratio s1 of the area of the range S1 where the oxide coatings are attached to the tip and the ratio s2 of the area of the range S2 where the plating is attached to the tip are calculated as follows: s1=6%; and s2=3%. Similarly, regarding the electrode 2 shown in FIG. 7(a), as shown in FIG. 7(b), the diameters of the electrode tip are calculated as follows: r1=5.02 mm; and r2=5.01 mm, and the ratio s1 of the area of the range S1 where the oxide coatings are attached to the tip and the ratio s2 of the area of the range S2 where the plating is attached to the tip are calculated as follows: s1=42%; and s2=10%. Regarding the electrode 2 shown in FIG. 8(a), as shown in FIG. 8(b), the diameters of the electrode tip are calculated as follows: r1=5.50 mm; and r2=5.39 mm, and the ratio s1 of the area of the range S1 where the oxide coatings are attached to the tip and the ratio s2 of the area of the range S2 where the plating is attached to the tip are calculated as follows: s1=14%; and s2=3%. Regarding the electrode 2 shown in FIG. 9(a), as shown in FIG. 9(b), the diameters of the electrode tip are calculated as follows: r1=5.21 mm; and r2=6.03 mm, and the ratio s1 of the area of the range S1 where the oxide coatings are attached to the tip and the ratio s2 of the area of the range S2 where the plating is attached to the tip are calculated as follows: s1=39%; and s2=3%. Regarding the electrode 2 shown in FIG. 10(a), as shown in FIG. 10(b), the diameters of the electrode tip are calculated as follows: r1=5.21 mm; and r2=6.03 mm.

The calculated diameters r1 and r2 of the electrode tip, and the calculated ratios of the waste materials are compared with the set values which are stored in the data storage section 5c and which are to be references of the diameters r1 and r2 of the electrode tip by the determining section 5b to determine whether the electrode is normal. In the first embodiment, each of the set values of the diameters r1 and r2 of the electrode tip is set to be in a range of 4.70-5.20 mm, both inclusive, and at least one of the set values of the ratio s1 of the area of the range S1 where the oxide coatings are attached to the tip, and the ratio s2 of the area of the range S2 where the plating is attached to the tip is set to be less than 20%. Furthermore, when the diameter of the electrode tip is 6.00 mm or more, that electrode is to be determined as the electrode 2 which is regarded as being outside of an allowable range. For example, regarding the electrode 2 in FIG. 6, the diameter r1 of the tip is 5.02 mm and the diameter r2 of the tip is 4.99 mm, which are within the range of the set values, and the ratio s1 of the area of the range S1 where the oxide coatings are attached to the tip is 6%, and the ratio s2 of the area of the range S2 where the plating is attached to the tip is 3%, which are within the range of the set values, and therefore, the electrode 2 in FIG. 6 is determined to be normal. Regarding the electrode 2 in FIG. 7, the diameter r1 of the tip is 5.02 mm and the diameter r2 of the tip is 5.01 mm, which are within the range of the set values, and the ratio s1 of the area of the range S1 where the oxide coatings are attached to the tip is 42%, and the ratio s2 of the area of the range S2 where the plating is attached to the tip is 10%, which are not within the range of the set values, and therefore, the electrode 2 in FIG. 7 is determined to be abnormal. Regarding the electrode 2 in FIG. 8, the ratio s1 of the area of the range S1 where the oxide coatings are attached to the tip is 14%, and the ratio s2 of the area of the range S2 where the plating is attached to the tip is 3%, which are within the range of the set values. However, the diameter r1 of the tip is 5.50 mm and the diameter r2 of the tip is 5.39 mm, which are not within the range of the set values, and therefore, the electrode 2 in FIG. 8 is determined to be abnormal. Regarding the electrode 2 in FIG. 9, the diameter r1 of the tip is 5.16 mm and the diameter r2 of the tip is 5.47 mm, which are not within the range of the set values, and the ratio s1 of the area of the range S1 where the oxide coatings are attached to the tip is 39%, and the ratio s2 of the area of the range S2 where the plating is attached to the tip is 3%, which are not within the range of the set values, and therefore, the electrode 2 in FIG. 9 is determined to be abnormal. Regarding the electrode 2 in FIG. 10, the diameter r1 of the tip is 5.21 mm and the diameter r2 of the tip is 6.03 mm, and since the diameter r2 is 6.00 mm or more, the electrode 2 in FIG. 10 is determined as the electrode 2 which is regarded as being outside of an allowable range. Therefore, in a calculation processing of the image in FIG. 10, the virtual circle C is not generated along the tip periphery of the electrode 2.

The set values of the diameters r1 and r2 of the electrode tip, and the ratio s1 of the range S1 where the oxide coatings are attached to the tip, and the ratio s2 of the range S2 where the plating is attached to the tip are calculated can be any values. In the first embodiment, if any one of the diameters r1 and r2 of the electrode tip, and the ratio s1 of the range S1 where the oxide coatings are attached to the tip, and the ratio s2 of the range S2 where the plating is attached to the tip is not within the set values, the electrode 2 is configured to be determined to be abnormal. However, the electrode 2 may be determined to be abnormal if both of the diameters and the ratios are not within the set value.

If the determining section 5b determines the electrode 2 to be abnormal, the control unit 5 commands the general-purpose robot (not shown) or the control unit (not shown) in the production line to dress the electrode 2. At this time, the control unit 5 may command the display section 4 to display a warning that, e.g., the electrode 2 is in an abnormal state. On the contrary, if the determining section 5b determines the electrode 2 to be normal, the control unit 5 commands the general-purpose robot (not shown) or the control unit (not shown) in the production line to do a next welding, and based on the command, the welding operation in the production line is resumed.

The data storage section 5c stores the captured image, the calculation result, and the result of the determination. After receiving a command from workers or the like to display data such as the captured image, the calculation result, and the result of the determination on the display section 4, the control unit 5 commands the display section 4 to display the data such as the captured image, the calculation result, and the result of the determination. Based on the command, the display section 4 displays the data such as the captured image, the calculation result, and the result of the determination.

Therefore, according to the first embodiment of the present invention, the electrode 2 is fixed to the fixing hole 72a, whereby a distance from the electrode 2 to the CCD camera 91 through the mirror 8 is constant. Therefore, when the calculation processing is performed with respect to the image of the tip of the electrode 2 by the calculation section 5a, variations of the measured values are less likely to occur. Besides, because of the mirror 8, the image of the tip of the electrode 2 is captured by the CCD camera 91 from the direct front thereof, and therefore, the captured image is processed by the calculation section 5a, thereby measuring at least two or more tip diameters r at one time. With this process, the measurement of the diameters r1 and r2 of the electrode tip, i.e., determination of whether the tip has a true circular shape or not, is accurately performed without reducing availability ratio in the production line.

Both surfaces of the mirror 8 simultaneously reflect the tips of the pair of the electrodes 2 vertically arranged, and therefore, images of the tips of the pair of the electrodes 2 are captured simultaneously, and the diameters r1 and r2 of the electrode tip are accurately measured without reducing availability ratio in the production line. Even when the weld gun G has the electrodes 2 with a particularly short distance therebetween, since the CCD camera 91 is not disposed between the electrodes 2, and the mirror 8 is only disposed between the electrodes 2, a width of a portion of the inspection apparatus body 6 located between the electrodes 2 is short, thereby providing a compact structure of the body as a whole.

The illumination light sources 92a disposed in the periphery of the lens of the CCD camera 91 are made of a LED, thereby generating light enough for the CCD camera 91 to capture images.

The tip periphery of the electrode 2 is illuminated by the edge detection light sources 73 from the radial direction with the electrode 2 fixed to the fixing hole 72a, and therefore, the tip periphery in the electrode 2 is clearly reflected on the image captured by the CCD camera 91. With this configuration, the image is accurately processed by a calculation section 5a, and the diameters r of the electrode tip can be precisely measured.

The LED of blue light is used for the edge detection light sources 73. Therefore, unlike an LED of white light, the blur in the tip periphery of the electrode 2 due to glaze of the electrode 2 does not occur, and the tip periphery of the electrode 2 is clearly reflected on the image captured by the CCD camera 91, whereby the calculation processing by the calculation section 5a is further accurate.

The electrode inspection apparatus 1 includes the display section 4 for displaying the images captured by the CCD camera 91, the calculation result processed by the calculation section 5a, and the result compared and determined by the determining section 5b. Therefore, the workers and the like can consider a dressing cycle of the electrode 2 and the like based on the obtained data after the inspection.

Since the display section 4 can display the images captured by the CCD camera 91, the calculation result processed by the calculation section 5a, and the result compared and determined by the determining section 5b, the workers can know the condition of the electrodes 2 even if the workers do not enter the production line, and the workers safely manages the production line.

<<Second Embodiment>>

Figure 11:
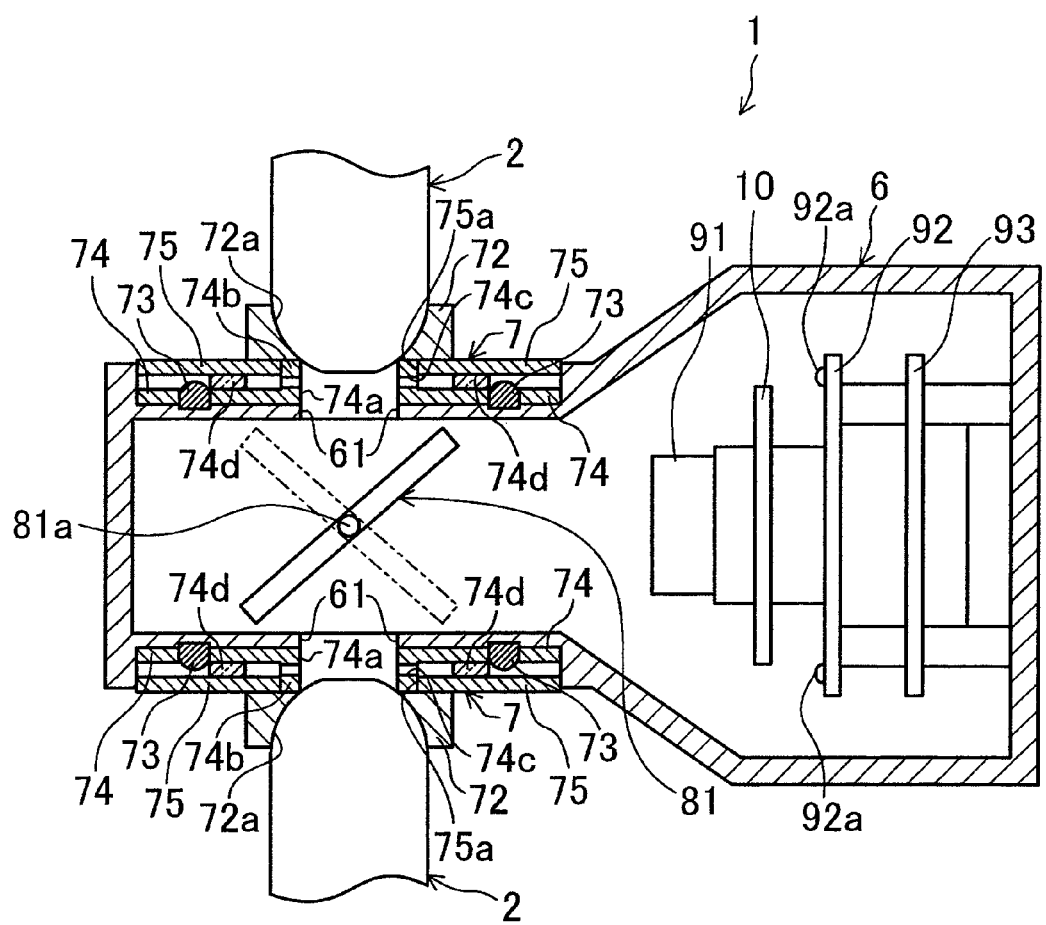
FIG. 11 is a view corresponding to FIG. 4 according to a second embodiment.

FIG. 11 shows an electrode inspection apparatus 1 for spot welding according to a second embodiment. The second embodiment has the same construction as in the first embodiment other than providing one single CCD camera 91 to reduce the length of an inspection apparatus body 6 in the longitudinal direction, and changing the structure of a minor 81. Therefore, the different parts will be specifically described hereinafter.

The minor 81 is formed into a plate shape, and is rotatably attached to the inside of the inspection apparatus body 6 by a rotation axis extending in the width direction of the inspection apparatus body 6. The minor 81 is obliquely disposed with respect to an electrode 2 so as to be distant from a fixing hole 72a at a position opposite to the electrode 2 with respect to a measuring reference unit 7, and is configured to rotate 90 degrees around the rotation axis 81a, thereby switching between the electrode 2 in an upper side to be captured by the CCD camera 91, and the electrode 2 in a lower side to be captured by the CCD camera 91. The minor 81 is connected to a control unit 5 which is not shown, and by the command from the control unit 5, the electrodes 2 to be captured can be switched.

Therefore, according to the second embodiment of the present invention, the advantage similar to the first embodiment, and if the mirror 81 rotates rotate 90 degrees around the rotation axis 81a, whereby respective tips of the pair of the electrodes 2 is imaged by the CCD camera 91. Therefore, the length of the inspection apparatus body 6 in the longitudinal direction is shortened, thereby providing the inspection apparatus with low cost and a compact structure.

<<Third Embodiment>>

Figure 12:
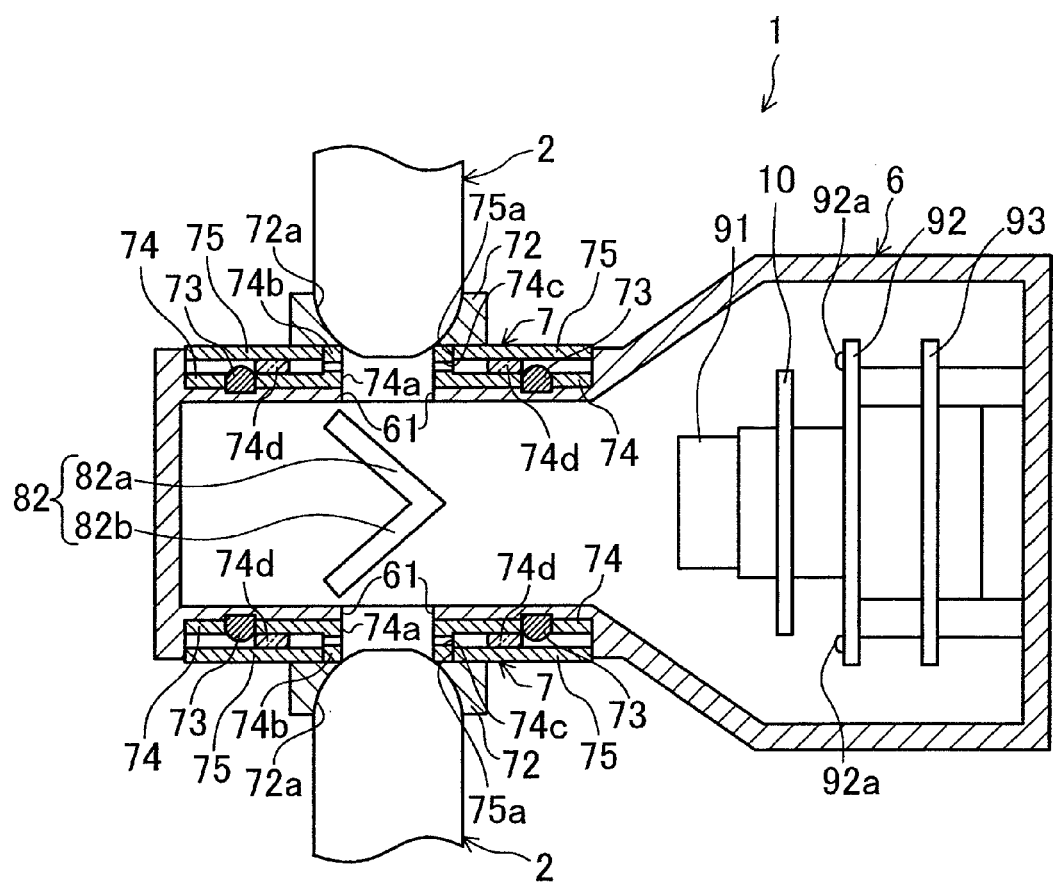
FIG. 12 is a view corresponding to FIG. 4 according to a third embodiment.

FIG. 12 shows an electrode inspection apparatus 1 for spot welding according to a third embodiment. The third embodiment has the same construction as in the second embodiment other than changing a structure of a mirror 82. Therefore, the different parts will be specifically described hereinafter.

The mirror 82 includes an upper mirror 82a and a lower mirror 82b each formed into a plate shape. The upper mirror 82a is obliquely disposed with respect to an electrode 2 so as to be distant from a fixing hole 72a at a position opposite to the electrode 2 with respect to a measuring reference unit 7 located in the upper side, and the lower mirror 82b is obliquely disposed with respect to the electrode 2 so as to be distant from a fixing hole 72a at a position opposite to the electrode 2 with respect to a measuring reference unit 7 located in the lower side. The mirror 82a and the lower mirror 82b are integrated at a side closer to the CCD camera 91, and has a V shape in cross-section. The CCD camera 91 is configured to simultaneously capture images of the tip of the electrode 2 reflected on the upper mirror 82a and the tip of the electrode 2 reflected on the lower mirror 82b from a direct front thereof.

Therefore, according to the third embodiment of the present invention, compared to the second embodiment, the respective tips of the pair of the electrodes 2 are simultaneously imaged by the CCD camera 91 even if the mirror 82 does not rotate. Therefore, compared to the second embodiment, the electrode inspection apparatus 1 be provided with low cost and a compact structure.

<<Fourth Embodiment>>

Figure 13:
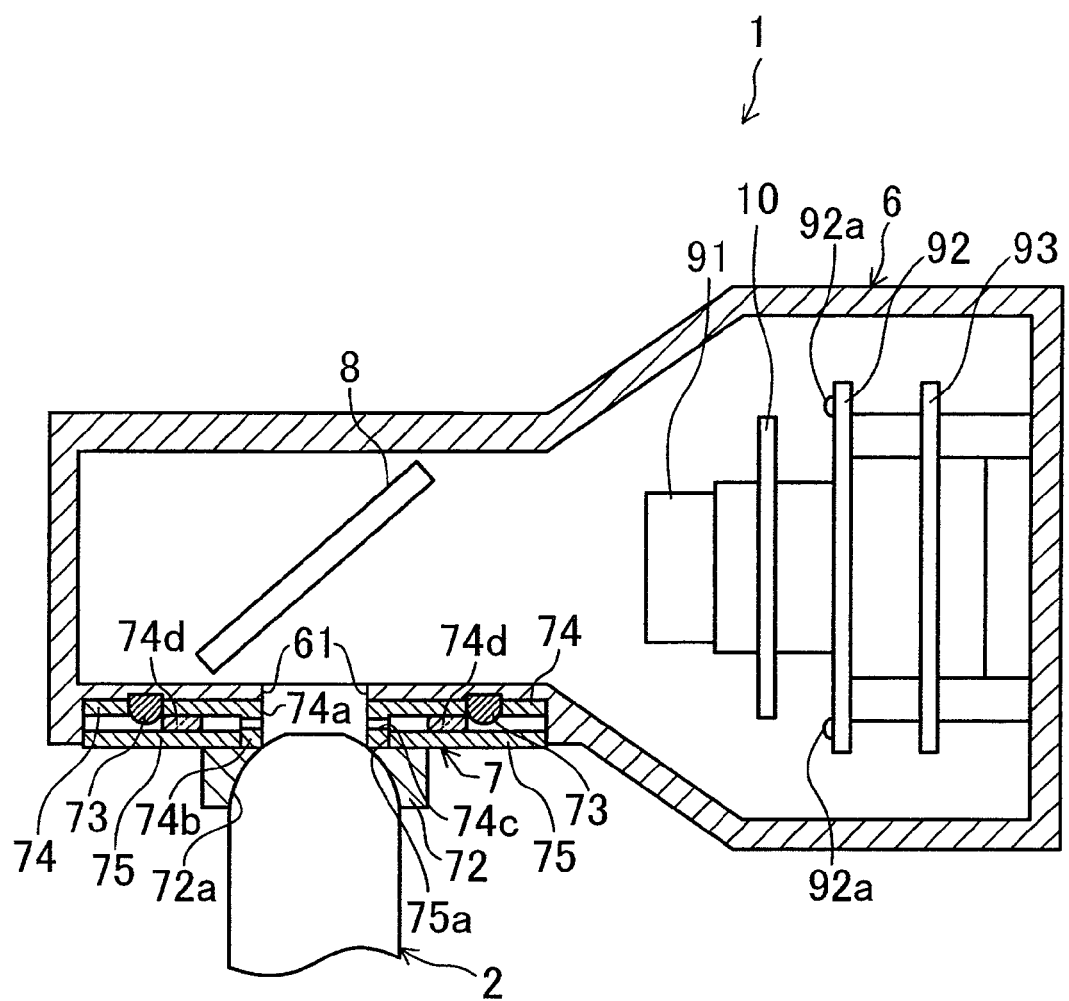
FIG. 13 is a view corresponding to FIG. 4 according to a fourth embodiment.

FIG. 13 shows an electrode inspection apparatus 1 for spot welding according to a fourth embodiment. The fourth embodiment has the same construction as in the first embodiment other than providing one measuring reference unit 7 and one CCD camera 91, and a mirror 8 having a mirror plane at one side. In this case, the tips of the pair of the electrodes 2 is only be measured one by one. For example, in order to know conditions of respective tips of the pair of the electrodes 2 in the weld gun G, it is necessary to change the position of the weld gun G to capture images of respective electrodes 2, resulting in capturing a time for inspection. However, the one measuring reference unit 7 and the one CCD camera 91 are provided, thereby reducing cost, and allowing the inspection apparatus body 6 to have a compact structure.

<<Fifth Embodiment>>

FIGS. 14-18 show an electrode inspection apparatus 1 for spot welding according to a fifth embodiment. In the fifth embodiment, a portion around a mirror 8 is modularized. In the fifth embodiment 5, the same reference characters as those shown in the first embodiment are used, and the different parts will be specifically described hereinafter.

Figure 14:
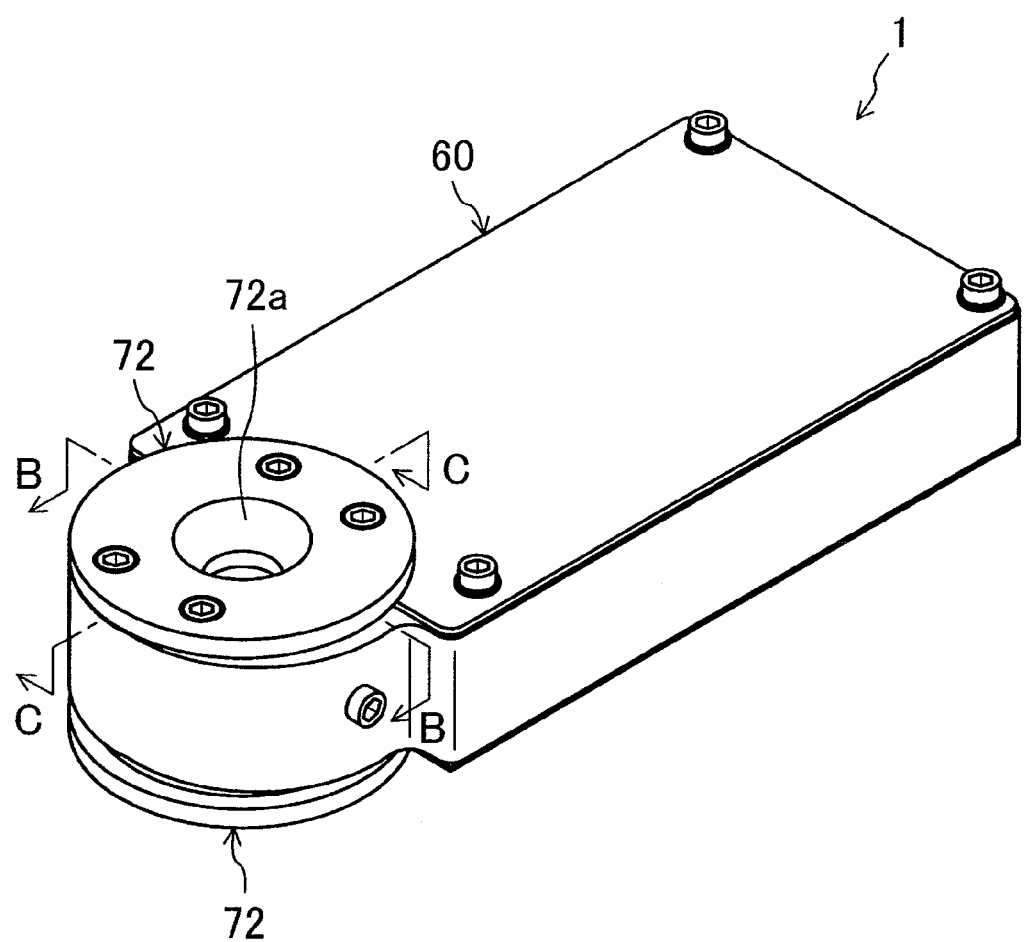
FIG. 14 is a view corresponding to FIG. 1 according to a fifth embodiment.

As shown in FIG. 14, the electrode inspection apparatus 1 for spot welding according to the fifth embodiment is formed in a flattened box shape with a thin thickness, and includes an inspection apparatus body 60, one side of the an inspection apparatus body 60 in the longitudinal direction thereof being curved outwardly so as to be formed into a substantially semidisc-shaped plate.

Figure 15:
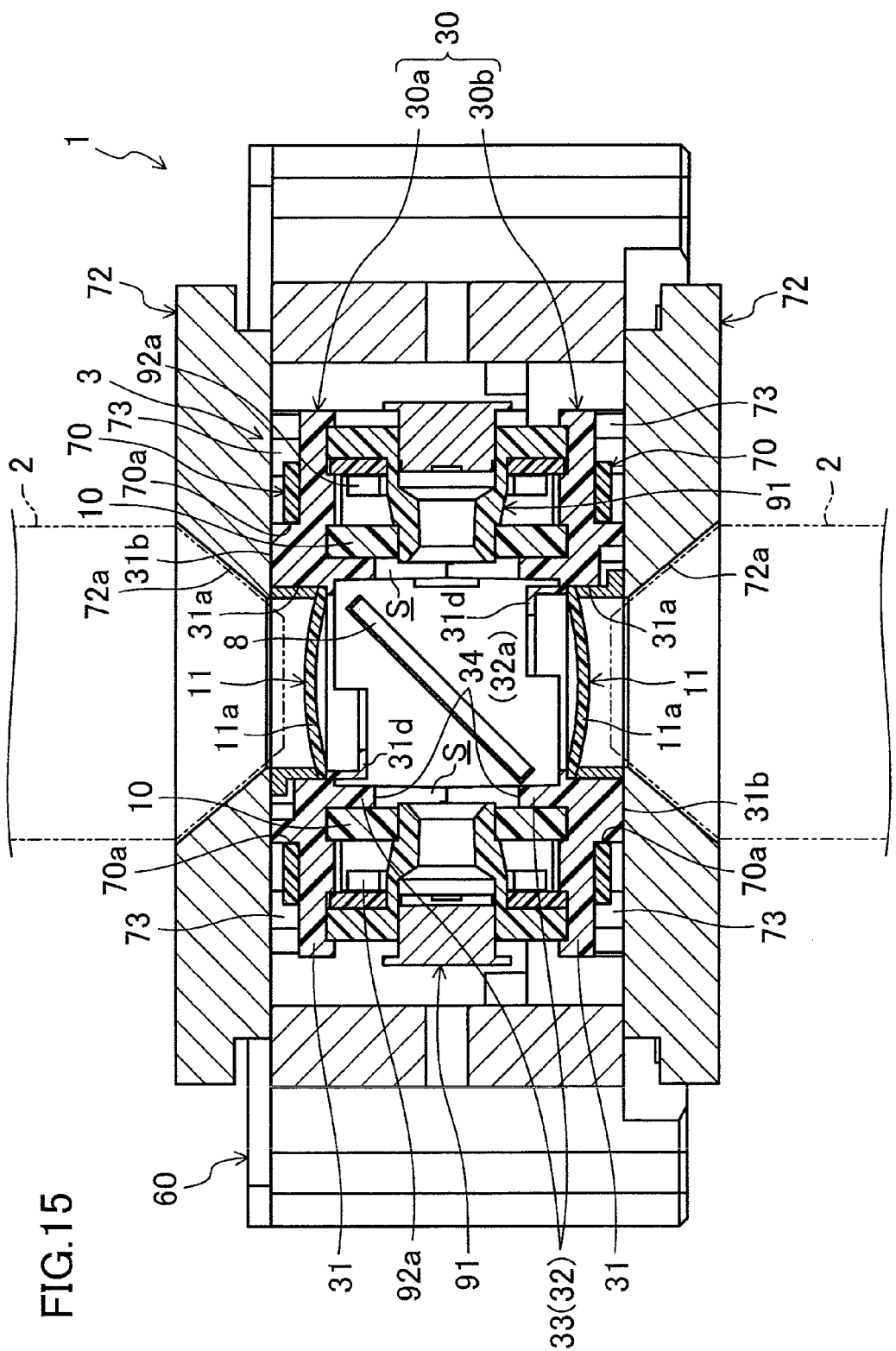
FIG. 15 is a cross-sectional view taken along line B-B in FIG. 14.
Figure 16:
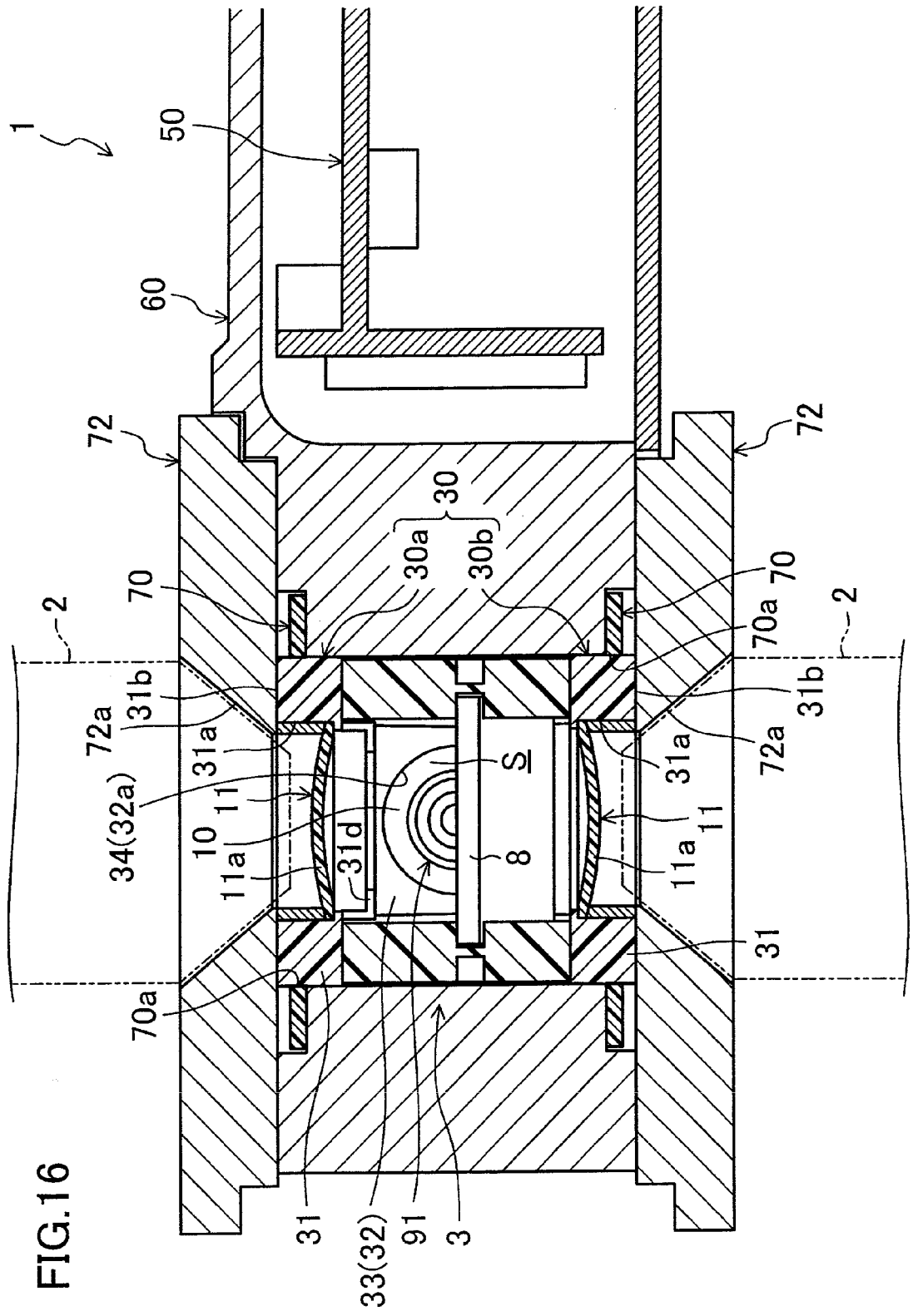
FIG. 16 is a cross-sectional view taken along line C-C in FIG. 14.

As shown in FIGS. 15 and 16, a mirror module 3 is disposed in the inside of the curved portion having a substantially semidisc-shaped plate in the one side of the inspection apparatus body 60 in the longitudinal direction thereof, a control substrate 50 is disposed in the inside of the other side, and a pair of electrode fixing plates (measuring reference units) 72 each having substantially a discoid shape and each including a fixing hole 72a for fixing electrodes 2 therein are disposed over and under the mirror module 3 so as to sandwich the mirror module 3.

The mirror module 3 extends in the width direction of the inspection apparatus body 60, and as shown in FIGS. 15 and 16, includes a module frame 30 made of a resin, and serving as a frame of the mirror module 3, where a mirror 8 is assembled in the central portion of the module frame 30. In substantially the central portion of the module frame 30 in the vertical direction, the module frame 30 is divided into an upper frame 30a located in the upper side and a lower frame 30b located in the lower side.

The upper frame 30a includes a plate frame 31 extending in the horizontal direction and including a through hole 31a corresponding to the fixing hole 72a of the electrode fixing plate 72 therein, and a pair of protruding plates 32 parallely disposed downwardly from positions which sandwich the through hole 31a of the plate frame 31, and in the lower edge of each of the protruding plates 32, a split-type recessed portion 32a recessed upwardly is formed.

Figure 17:
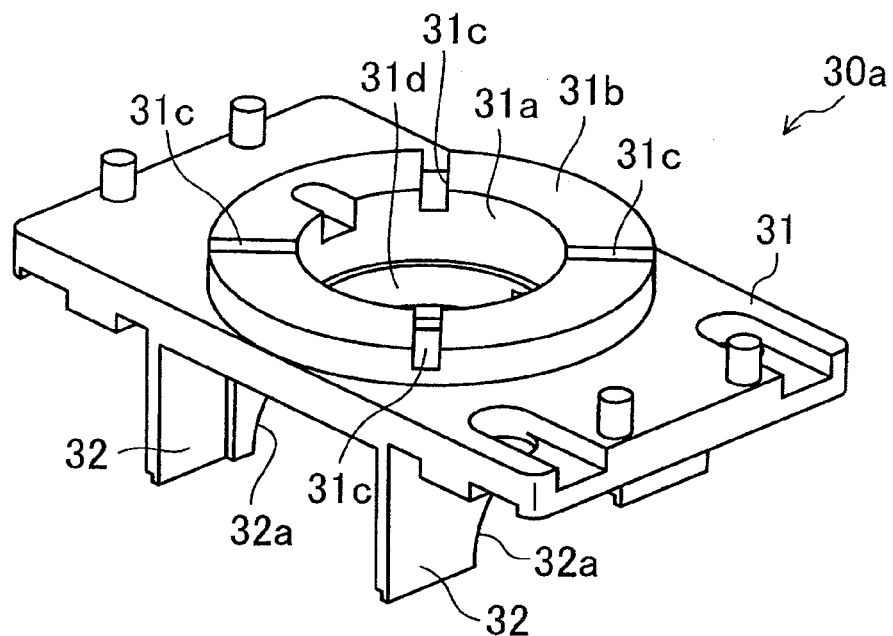
FIG. 17 is a perspective view of an upper frame according to the fifth embodiment of the present invention when viewed from above.

As shown in FIG. 17, a circular protrusion 31b is disposed upwardly on the upper surface of the plate frame 31 along the periphery of the through hole 31a, and on the upper surface of the circular protrusion 31b, grooves 31c extending in the radial direction are radially formed so as to divide the circumference into four parts equally. The upper surface of the plate frame 31 is provided with a light source fixing plate 70 in which a fitting hole 70a is formed so that the fitting hole 70a fits with the outer periphery of the protrusion 31b, and four edge detection light sources 73 are attached to the light source fixing plate 70 so as to correspond to respective grooves 31c of the protrusion 31b. Therefore, light emitted from the edge detection light sources 73 passes through the respective grooves 31c, and illuminates the tip periphery electrode 2 fixed to the fixing hole 72a from the radial direction.

On the lower surface of the plate frame 31, a shield plate 31d having a semi arc-shape and an L-shaped cross section is disposed downwardly along the periphery of the through hole 31a in one side of the plate frame 31 in the longitudinal direction thereof. The shield plate 31d is located between the illumination light source 92a and the electrodes 2 to shield light emitted from the illumination light sources 92a and directly directing toward the electrode 2. Therefore, even when the distance between the illumination light source 92a and the electrode 2 is shortened, the light emitted from the illumination light sources 92a does not directly illuminate the tip of the electrode 2, and the structure avoids a state where the light directly illuminating the tip of the electrode 2 from the illumination light sources 92a reflects on the CCD camera 91, and the like. Therefore, the inspection apparatus body 60 has a compact structure while the electrode 2 is clearly viewed.

Figure 18:
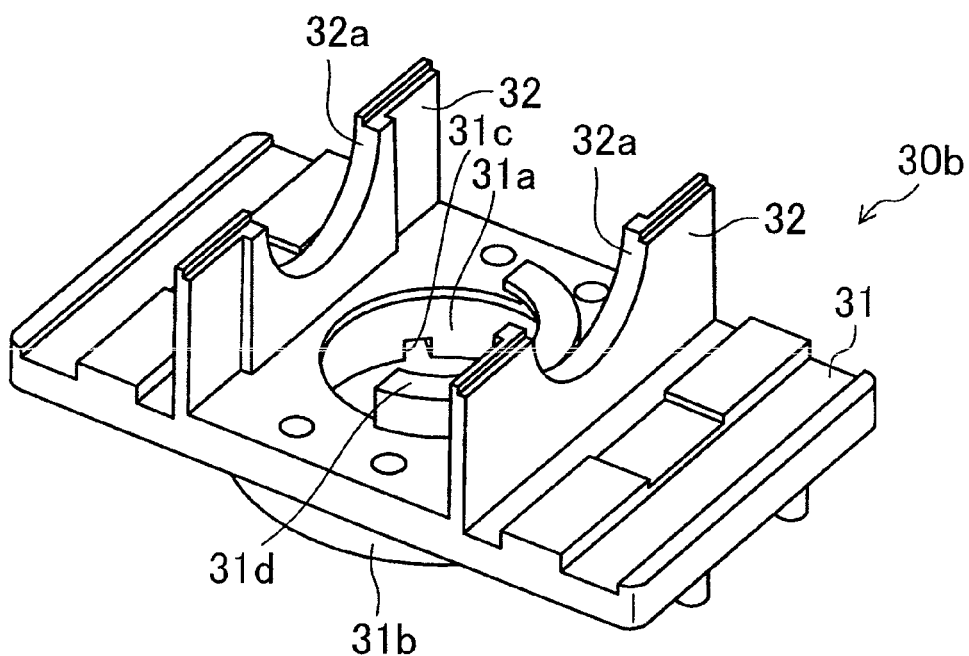
FIG. 18 is a perspective view of a lower frame according to the fifth embodiment of the present invention when viewed from below.

The lower frame 30b, as shown in FIGS. 15 and 18, has the same structure as the structure of the upper frame 30a, and therefore, the same reference characters as those shown in the upper frame 30a are used, and the explanation thereof will be omitted.

When the module frame 30 is assembled so that the shield plates 31d are in a point symmetric arrangement when viewed from side, and the edge of the protruding plate 32 in the upper frame 30a and the edge of the protruding plate 32 in the lower frame 30b mesh with each other, light quantity adjustment walls 33 are formed in the protruding plate 32 of the upper side and in the protruding plate 32 of the lower side, light through holes 34 are formed in the split-type recessed portion 32a of the upper side and in the split-type recessed portion 32a of the lower side, and the mirror 8 is assembled in the central portion of the module frame 30 and is sandwiched by the light quantity adjustment walls 33.

In both ends of the module frames 30 in the longitudinal direction thereof, a pair of CCD cameras 91 for imaging the tips of the electrodes 2 from a direct front thereof reflected on the mirror 8 by reflection are assembled so as to distance from the mirror 8 in both sides of the mirror 8, and each of the light quantity adjustment walls 33 is disposed so as to be in the vicinity of the front of the CCD camera 91. A space S through which the light emitted from the illumination light sources 92a passes is formed between the inner periphery of the light through holes 34 and the outer periphery of the CCD camera 91, and part of the light emitted from the illumination light sources 92a are shielded by the light quantity adjustment walls 33, thereby making it possible to set light quantity appropriate for imaging the electrodes 2 to image the electrodes 2 clearly.

A diffusion plate 10 made of a resin having a milky white color extends in the vertical direction between the light quantity adjustment walls 33 in the module frame 30 and the CCD camera 91, and is configured to diffuse the light emitted from the plurality of the illumination light sources 92a and directing toward the mirror 8, thereby alleviating the problem of a non-uniform brightness distribution in light.

In addition, a protective cover 11 made of a transparent resin is provided in the inner side of the through hole 31a in the plate frame 31 for filling the fixing hole 72a and preventing dust and the like from entering the mirror module 3, and the protective cover 11 is provided with a curved portion 11a for reflecting the light which has been reflected on the mirror 8 from the illumination light sources 92a beyond a scope where the CCD camera 91 can capture images. Therefore, this prevents dust and the like attached to the tip of the electrode 2 in the protective cover 11 from entering the inside of the inspection apparatus body 60 from the fixing hole fixing hole 72a, and the light emitted from the illumination light sources 92a and reflecting on the protective cover 11 is diffused in the curved portion 11a and does not reflect on the lens of the CCD camera 91, thereby making it possible to image the electrodes 2 clearly.

The configuration and the control of a control unit 5 in the electrode inspection apparatus 1 for spot welding according to the fifth embodiment are similar to that of the control unit 5 in the first embodiment, and the explanation thereof will be omitted.

In the first through fifth embodiments, the four edge detection light sources 73 are attached in one measuring reference unit 7. At least two or more of the edge detection light sources 73 may be attached to the one measuring reference unit 7, and it is preferable to attach three or more of the edge detection light sources 73 to the one measuring reference unit 7. Although the blue LED is used for the edge detection light sources 73, any colour of an LED in addition to the blue one can be used as long as it clearly can reflect the tip periphery of the electrodes 2 in the images captured by the CCD cameras 91.

In the first through fifth embodiments, one main body of the inspection apparatus 6 is provided. A plurality of the inspection apparatus body 6 may be controlled by one control unit 5.

In the first through fifth embodiments, although the CCD cameras 91 are used for imaging the tips of the electrodes 2, CMOS cameras may be used.

In the images captured in the first through fifth embodiments, the conditions of the tips of the electrodes 2 may be known by performing a calculation processing by a general binarization process.

INDUSTRIAL APPLICABILITY

The present invention is suitable for an electrode inspection apparatus for spot welding used in, for example, automobile production lines.

DESCRIPTION OF REFERENCE CHARACTERS

1 Electrode Inspection Apparatus for Spot Welding
2 Electrode
4 Display Section
5 Control unit
5a Calculation Section
5b Determining Section
5c Data Storage Section
6 Inspection Apparatus Body
7 Measuring Reference Unit
8, 81, 82 Minor
11 Protective Cover
11a Curved Portion
31d Shield Plate
33 Light Quantity Adjustment Wall
34 Light Though hole
60 Inspection Apparatus Body
72 Electrode Fixing Plate (Measuring Reference Unit)
72a Fixing Hole
73 Edge Detection Light Source
91 CCD Camera
92a Illumination Light Source
S Space

The invention claimed is:

1. An electrode inspection apparatus for spot welding, the apparatus comprising:
an inspection apparatus body in which one or more cameras for imaging tips of one or more electrodes for spot welding held to a weld gun are disposed; and
a control unit having a calculation section processing images of the tips of the electrodes captured by the cameras, and a determining section comparing a calculation result in the calculation section with a preset value to determine conditions of the tips of the electrodes, wherein
the inspection apparatus body includes a measuring reference unit in which a fixing hole for inserting and fixing each of the tips of the electrodes is formed, a mirror obliquely fixed with respect to one of the tips of the electrodes fixed to the fixing hole at a position opposite to a side of the measuring reference unit from which the electrodes are inserted and a part from the fixing hole in a direction in which each of the electrodes is inserted, and a plurality of edge detection light sources illuminating a periphery of the tips of the electrodes from a radial direction with each of the electrodes fixed to the fixing hole,
each of the cameras is disposed away from the mirror with a distance there between in a direction orthogonal to the direction in which each of the electrodes is inserted into the fixing hole so as to image each of the tips of the electrodes from a direct front thereof, and
illumination light sources emitting light toward the mirror are disposed around a periphery of the lens of the cameras.

2. The apparatus of claim 1, wherein
a pair of the electrodes are provided so as to face each other in both sides of the mirror,
the mirror is formed into a plate shape, and has mirror planes for reflecting the tips of the electrodes at both sides thereof, and
a pair of the cameras are provided in the both sides of the mirror.

3. The apparatus of claim 1, wherein
a pair of the electrodes are provided so as to face each other in both sides of the mirror,
the mirror is formed into a plate shape, has a mirror plane for reflecting the tips of the electrodes at one side thereof, and is rotatably attached to the inspection apparatus body, and
the mirror is rotated to switch the electrodes reflected on the mirror, and one of the cameras is configured to image the respective tips of the electrodes from a direct front thereof.

4. The apparatus of claim 1, wherein
a pair of the electrodes are provided so as to face each other in both sides of the mirror,
the mirror is provided so as to include a pair of mirror sections for reflecting the respective tips of the electrodes, and
one of the cameras is configured to simultaneously image the respective tips of the electrodes reflected on the respective mirrors from a direct front thereof.

5. The apparatus of claim 1, wherein
the illumination light sources are made of an LED.

6. The apparatus of claim 1, wherein
the inspection apparatus body is provided with a light quantity adjustment wall including a light through hole therein and disposed so as to be in a vicinity of a front of each of the cameras, and
a space through which light emitted from the illumination light sources passes is formed between an inner periphery of the light through hole and the outer periphery of each of the cameras.

7. The apparatus of claim 1, wherein
the inspection apparatus body is provided with a protective cover for filling the fixing hole, and
the protective cover is provided with a curved portion for reflecting light which has been reflected on the mirror from the illumination light sources beyond a scope where the cameras capture images.

8. The apparatus of claim 1, wherein
the inspection apparatus body is provided with a shield plate shielding light emitted from the illumination light sources and directly directing toward the electrode, and located between the illumination light sources and each of the electrodes.

9. The apparatus of claim 1, wherein
the edge detection light sources are made of a blue LED.

10. The apparatus of claim 1, wherein
the control unit includes a data storage section storing the images captured by the cameras, the calculation result processed by the calculation section, and a result of comparison and determination by the determining section.

11. The apparatus of claim 1, wherein
a display section includes for displaying the images captured by the cameras, the calculation result processed by the calculation section, and a result of comparison and determination by the determining section.

12. The apparatus of claim 1, wherein
an inspection apparatus body includes a board which is provided between the measuring reference unit and the mirror, the edge detection light sources are fixed to a part of the board adjacent to the measuring reference unit, the board includes a through hole corresponding to the fixing hole and the mirror, and a circular protrusion provided around the through hole, protruding toward the measuring reference unit, and having an edge contacting a part of a periphery of the fixing hole adjacent to the board, and the circular protrusion is provided with a light source hole guiding light emitted from a corresponding one of the edge detection light sources to a tip periphery of a corresponding one of the electrodes at a position of a part of the circular protrusion associated with a corresponding one of the edge detection light sources.

* * * * *